(12) United States Patent
Zhou et al.

(10) Patent No.: US 10,762,014 B2
(45) Date of Patent: *Sep. 1, 2020

(54) METHOD AND DEVICE FOR IMPLEMENTING LTE BASEBAND RESOURCE POOL

(71) Applicant: HUAWEI TECHNOLOGIES CO., LTD., Shenzhen, Guangdong (CN)

(72) Inventors: Aiming Zhou, Shanghai (CN); Chunjing Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

This patent is subject to a terminal disclaimer.

(21) Appl. No.: 15/096,702

(22) Filed: Apr. 12, 2016

(65) Prior Publication Data

US 2016/0224491 A1 Aug. 4, 2016

Related U.S. Application Data

(63) Continuation of application No. 13/774,538, filed on Feb. 22, 2013, now Pat. No. 9,344,917, which is a
(Continued)

(51) Int. Cl.
*G06F 13/364* (2006.01)
*H04W 28/08* (2009.01)
(Continued)

(52) U.S. Cl.
CPC .......... *G06F 13/364* (2013.01); *G06F 13/404* (2013.01); *G06F 13/4282* (2013.01);
(Continued)

(58) Field of Classification Search
CPC .................................................. G06F 13/364
See application file for complete search history.

(56) References Cited

U.S. PATENT DOCUMENTS 9,344,917 B2 * 5/2016 Zhou .................. H04W 28/08
2002/0123365 A1 9/2002 Thorson et al.
(Continued)

FOREIGN PATENT DOCUMENTS

CN 101163316 A 4/2008
CN 101175259 A 5/2008
(Continued)

OTHER PUBLICATIONS

Notice of Allowance, dated Jan. 12, 2016, in U.S. Appl. No. 13/774,538.
(Continued)

*Primary Examiner* — Kodzovi Acolatse
*Assistant Examiner* — Abdeltif Ajid
(74) *Attorney, Agent, or Firm* — Slater Matsil, LLP

(57) ABSTRACT

A method for implementing a baseband resource pool in an LTE base station is provided. The LTE base station includes a main control module, a master board a slave board. The master board and the slave board each include a baseband processing module. The main control module configures information of a cell needing load sharing on the master board to the slave board, and configures user information in the cell to each of the master board and the slave board, or configures the user information to each of the master board and the slave board according to load balance. The master board and the slave board each perform load sharing processing on an SRS signal of a user. The slave board including the baseband processing module is added, thereby improving the baseband processing capability of the LTE base station.

12 Claims, 11 Drawing Sheets

Related U.S. Application Data continuation of application No. PCT/CN2011/082612, filed on Nov. 22, 2011.

(51) Int. Cl.
| | | |
|---|---|---|
| *G06F 13/40* | (2006.01) | |
| *G06F 13/42* | (2006.01) | |
| *H04L 5/00* | (2006.01) | |
| *H04L 25/02* | (2006.01) | |
| *H04W 88/08* | (2009.01) | |

(52) U.S. Cl.
CPC .......... *H04W 28/08* (2013.01); *H04L 5/0037* (2013.01); *H04L 5/0048* (2013.01); *H04L 25/0224* (2013.01); *H04W 88/08* (2013.01)

(56) References Cited

U.S. PATENT DOCUMENTS

| | | | |
|---|---|---|---|
| 2007/0177552 A1* | 8/2007 | Wu | H04W 88/08 370/335 |
| 2007/0293229 A1 | 12/2007 | Khan | |
| 2009/0149221 A1* | 6/2009 | Liu | H04W 88/085 455/561 |
| 2010/0113095 A1 | 5/2010 | Carmon et al. | |
| 2010/0296485 A1 | 11/2010 | Kobori | |
| 2010/0303016 A1 | 12/2010 | Jin et al. | |
| 2011/0053598 A1 | 3/2011 | Ahluwalia | |
| 2011/0103315 A1* | 5/2011 | Camp, Jr. | H04L 1/1854 370/329 |
| 2011/0103395 A1 | 5/2011 | Ratnakar et al. | |
| 2011/0176480 A1 | 7/2011 | Dahlman et al. | |
| 2011/0194510 A1 | 8/2011 | Gaal et al. | |
| 2011/0250918 A1 | 10/2011 | Jen | |
| 2012/0028663 A1* | 2/2012 | Nejatian | H04W 16/14 455/501 |
| 2012/0044893 A1* | 2/2012 | Suzuki | H04W 72/0413 370/329 |
| 2012/0052899 A1 | 3/2012 | Wang et al. | |
| 2012/0113831 A1 | 5/2012 | Pelletier et al. | |
| 2013/0034089 A1* | 2/2013 | Nakashima | H04L 5/001 370/337 |
| 2013/0337823 A1 | 12/2013 | Tiirola et al. | |

FOREIGN PATENT DOCUMENTS

| | | | | |
|---|---|---|---|---|
| CN | 101217786 A | 7/2008 | | |
| CN | 101232654 A | 7/2008 | | |
| EP | 1868406 A2 | 12/2007 | | |
| JP | WO 2011099225 A1 * | 8/2011 | ............ | H04L 5/001 |
| RU | 2415516 C2 | 3/2011 | | |
| WO | WO2009019062 A2 | 2/2009 | | |
| WO | WO-2011099225 A1 * | 8/2011 | ........ | H04W 72/0413 |
| WO | WO2011/137408 A2 | 11/2011 | | |

OTHER PUBLICATIONS

Advisory Action, dated Sep. 14, 2015, in U.S. Appl. No. 13/774,538.
Russian Notice of Allowance dated Jun. 1, 2015 in corresponding Russian Patent Application No. 2014121985/07(035569).
Final Office Action, dated May 20, 2015, in U.S. Appl. No. 13/774,538.
Extended European Search Report dated Feb. 10, 2015 in corresponding European Patent Application No. 11876265.7.
Office Action, dated Oct. 15, 2014, in U.S. Appl. No. 13/774,538.
Chinese Search Report dated Aug. 26, 2013 in corresponding Chinese Application No. 2011800028406.
International Search Report of Corresponding PCT Application PCT/CN2011/082612 dated Sep. 6, 2012.
U.S. Appl. No. 13/774,538, filed Feb. 22, 2013, Zhou et al., Huawei Technologies Co., Ltd.
*3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)*, 3GPP TS 36.300 V10.1.0 (Sep. 2010), pp. 1-192.

* cited by examiner

METHOD AND DEVICE FOR IMPLEMENTING LTE BASEBAND RESOURCE POOL

CROSS-REFERENCE TO RELATED APPLICATIONS

This application is a continuation of U.S. patent application Ser. No. 13/774,538, filed on Feb. 22, 2013, which is a continuation of International Application No. PCT/CN2011/082612, filed on Nov. 22, 2011. The afore-mentioned patent applications are hereby incorporated by reference in their entireties.

FIELD OF THE INVENTION

The present invention relates to the field of communications technologies, and in particular, to a method and a device for implementing a baseband resource pool in an LTE base station.

BACKGROUND OF THE INVENTION

An LTE (Long Term Evolution, long term evolution) base station usually includes a baseband processing module, and is configured to implement a baseband function, which includes a physical layer protocol, algorithms and features relative to a baseband. Once the base station is deployed, a processing capability is relatively stable. With the evolution of the protocol and the development of a future service, a high requirement is proposed for a baseband processing capability gradually. A few years later, a processing capability of an original baseband processing unit, for example, a baseband board, usually cannot satisfy requirements of new features and algorithms. However, operators usually expect to protect the existing investment, and reduce the effect on the existing service at the same time. Therefore, the operators put forward a requirement of a baseband resource pool between boards, to improve the baseband processing capability through a manner of adding the baseband processing unit.

At present, with the popularization of smart terminals, the number of users in a cell continuously increases. In an LTE base station, the number of on-line and handover users needing cell support is more and more, the increase of the number of users may lead to that the baseband processing capability of an SRS (Sounding Reference Signal, sounding reference signal) and the PUCCH (Physical Uplink Control Channel, physical uplink control channel) channel needed by uplink measuring and feed backing also needs to increase greatly.

In addition, the newly added feature and algorithm of the protocol also put forward a higher requirement for the baseband processing capability of the control channel. For example, an OTDOA (Observed Time Difference of Arrival, observed time difference of arrival) positioning service requires that the SRS channel is used to measure position information of a UE (User Equipment, user equipment).

In addition, with the continuous development of a multi-antenna technology of the protocol, the requirement for the processing capability of uplink and downlink service channels also continuously increases.

In the LTE base station, the problem of the insufficient processing capability of the existing baseband module needs to be solved through a baseband resource pool technology. The existing baseband resource pool technology usually implements baseband resource sharing in a baseband processing module, such as a baseband board, and implements exchange of redundant cell data between baseband modules. There is no technical solution for implementing processing capability extension between the baseband boards through the baseband resource pool.

SUMMARY OF THE INVENTION

The present invention provides a method for implementing a baseband resource pool in an LTE base station, so as to implement baseband processing capability extension between baseband boards through the baseband resource pool.

In order to implement the foregoing objectives, the present invention provides the following technical solutions:

The LTE base station includes a main control module, a master board and a slave board, where the master board and the slave board each include a baseband processing module. The method includes:

configuring, by the main control module, information of a cell needing load sharing on the master board to the slave board;

modifying, by the main control module, an SRS configuration parameter of the cell according to a baseband processing capability of the LTE base station;

configuring, by the main control module, an SRS resource allocation policy of the cell;

configuring, by the main control module, user information in the cell to each of the master board and the slave board, or configuring the user information to each of the master board and the slave board according to load balance; and performing load sharing processing, by the master board and the slave board, on an SRS signal of a user according to the SRS resource allocation policy.

The present invention further provides a method for implementing a baseband resource pool in an LTE base station. The LTE base station includes a main control module, an L2 scheduling module, a master board and a slave board, where the master board and the slave board each include a baseband processing module. The method includes:

configuring, by the main control module, information of a cell needing load sharing on the master board to the slave board;

modifying, by the main control module, a configuration parameter of the cell according to a baseband processing capability of the LTE base station;

configuring, by the main control module, user information in the cell to each of the master board and the slave board, or configuring the user information to each of the master board and the slave board according to load balance;

allocating, by the L2 scheduling module according to the load balance, uplink users needing to be processed at a current TTI to the master board and the slave board for processing; and processing, by each of the master board and the slave board, the PUSCH (Physical Uplink Shared Channel, physical uplink shared channel) and the PUCCH of an uplink user.

The present invention further provides a method for implementing a baseband resource pool in an LTE base station. The LTE base station includes a main control module, an L2 scheduling module, an intermediate radio frequency module, a master board and a slave board, where the master board and the slave board each include a baseband processing module. The method includes:

configuring, by the main control module, information of a cell needing load sharing on the master board to the slave board;

modifying, by the main control module, a configuration parameter of the cell according to a baseband processing capability of the LTE base station;

configuring, by the main control module, user information in the cell to each of the master board and the slave board, or configuring the user information to each of the master board and the slave board according to load balance;

allocating, by the L2 scheduling module according to the load balance, downlink users needing to be processed at a current TTI to the master board and the slave board for processing;

performing bit-level processing, by each of the master board and the slave board, on a PDSCH TB (Physical Downlink Shared Channel Transport Block, physical downlink shared channel transport block) block of a downlink user;

sending, by the slave board, data after the bit-level processing to the master board; and processing, by the master board, all the data after the bit-level processing, and sending a processing result to the intermediate radio frequency module.

The present invention further provides a device for implementing a baseband resource pool in an LTE base station, including: a main control module, a master board and a slave board, where:

the main control module is configured to configure information of a cell needing load sharing on the master board to the slave board, modify a sounding reference signal SRS configuration parameter of the cell according to a baseband processing capability of the LTE base station, configure an SRS resource allocation policy of the cell, configure user information in the cell to each of the master board and the slave board, or configure the user information to each of the master board and the slave board according to load balance; and the master board and the slave board each include a baseband processing module, and are configured to perform load sharing processing on an SRS signal of a user according to the SRS resource allocation policy.

The present invention further provides a method and a device for implementing a baseband resource pool in an LTE base station, where the device includes a main control module, an L2 scheduling module, a master board and a slave board, where:

the main control module is configured to configure information of a cell needing load sharing on the master board to the slave board, modify a configuration parameter of the cell according to a baseband processing capability of the LTE base station, configure user information in the cell to each of the master board and the slave board, or configure the user information to each of the master board and the slave board according to load balance;

the L2 scheduling module is configured to allocate, according to the load balance, uplink users needing to be processed at a current TTI to the master board and the slave board for processing; and the master board and the slave board each include a baseband processing module, and each are configured to process the PUSCH and the PUCCH of an uplink user.

The present invention further provides a method and a device for implementing a baseband resource pool in an LTE base station, where the device includes a main control module, an L2 scheduling module, an intermediate radio frequency module, a master board and a slave board, where:

the main control module is configured to configure information of a cell needing load sharing on the master board to the slave board, modify a configuration parameter of the cell according to a baseband processing capability of the LTE base station, configure user information in the cell to each of the master board and the slave board, or configure the user information to each of the master board and the slave board according to load balance;

the L2 scheduling module is configured to allocate, according to the load balance, downlink users needing to be processed at a current TTI to the master board and the slave board for processing;

the slave board includes a baseband processing module, and is configured to perform bit-level processing on a PDSCH TB block of a downlink user, and send data after the bit-level processing to the master board;

the master board includes a baseband processing module, and is configured to perform bit-level processing on the PDSCH TB block of the downlink user, process all the data after the bit-level processing and send a processing result to the intermediate radio frequency module; and the intermediate radio frequency module is configured to receive the processing result sent by the master board.

In the method and the device for implementing a baseband resource pool in an LTE base station provided by the present invention, the slave board including the baseband processing module is added, thereby improving the baseband processing capability of the LTE base station.

BRIEF DESCRIPTION OF THE DRAWINGS

To illustrate the technical solutions according to the embodiments of the present invention or in the prior art more clearly, the accompanying drawings required for describing the embodiments or the prior art are introduced below briefly. Apparently, the accompanying drawings in the following descriptions merely show some of the embodiments of the present invention, and persons of ordinary skill in the art can obtain other drawings according to the accompanying drawings without creative efforts.

DETAILED DESCRIPTION OF THE EMBODIMENTS

Figure 1:
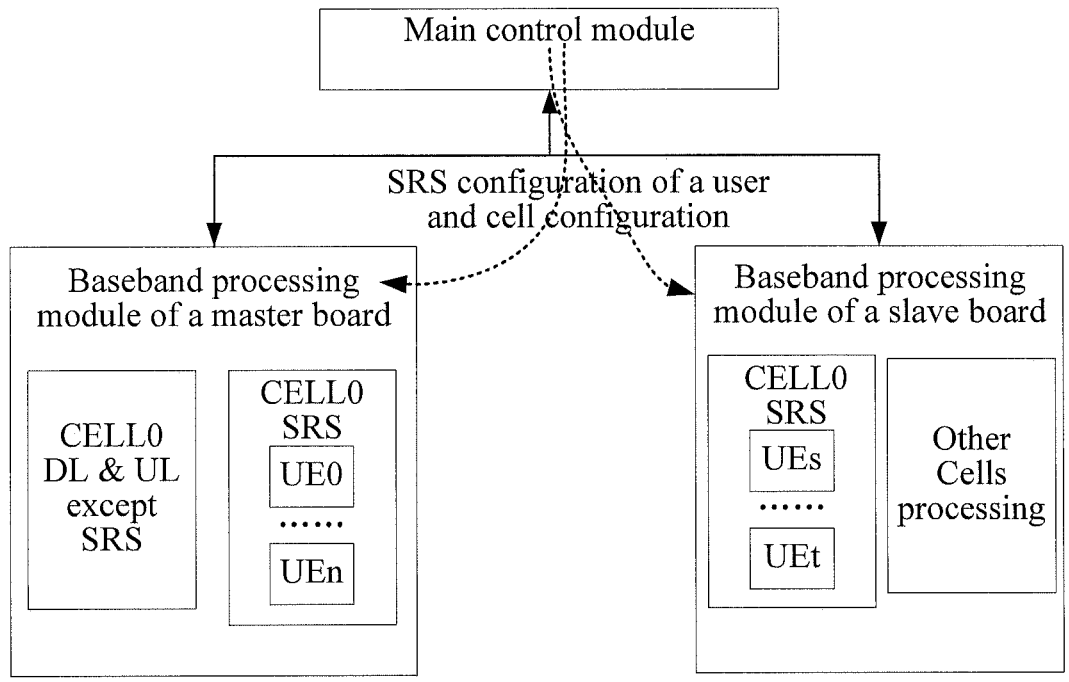
FIG. 1 is a schematic diagram of a method for implementing a baseband resource pool in an LTE base station provided by an embodiment of the present invention.
Figure 2:
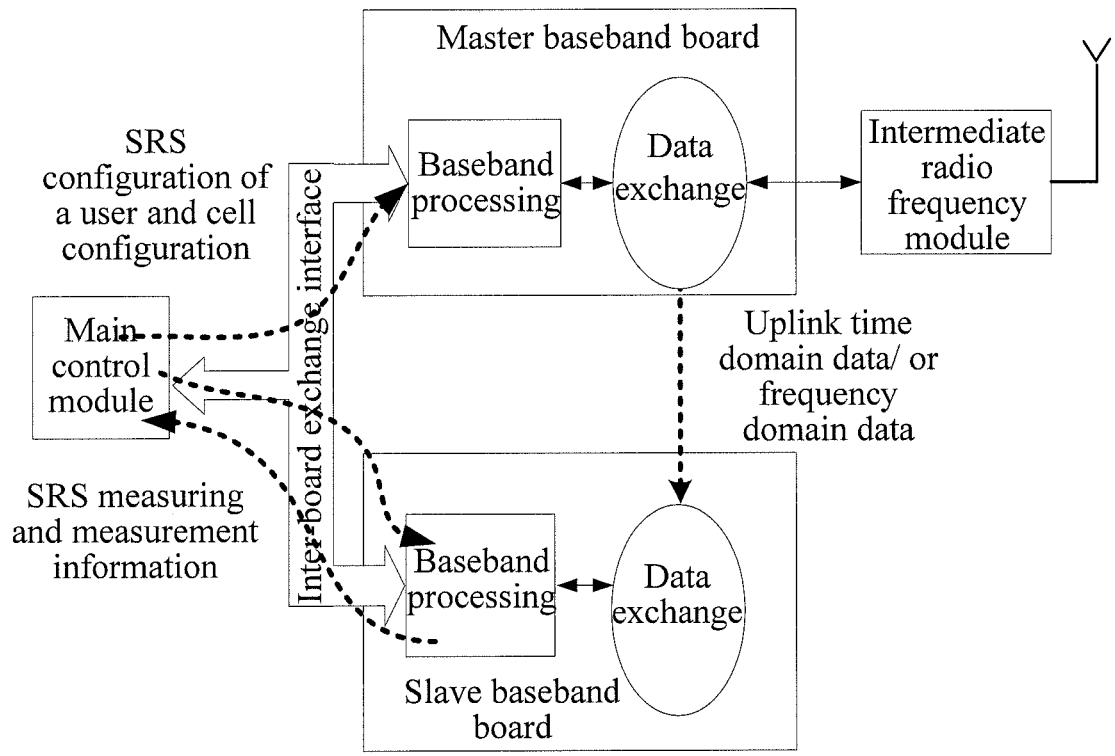
FIG. 2 is a diagram of an inter-board interface of a baseband resource pool in an LTE base station provided by an embodiment of the present invention.

In order for persons skilled in the art to better understand the technical solutions of the present invention, the technical solutions in the embodiments of the present invention are hereinafter described clearly and completely with reference to the accompanying drawings in the embodiments of the present invention. Evidently, the described embodiments are only some exemplary embodiments of the present invention, rather than all embodiments of the present invention. All other embodiments obtained by persons with ordinary skill in the art based on the embodiments of the present invention without creative efforts shall fall within the protection scope of the present invention.

The terms "system" and "network" in this document can always be exchanged for use in this document. The term "and/or" in this document is only an association relationship for describing associated objects, and represents that three relationships may exist, for example, A and/or B may represent the following three cases: A exists separately, and both A and B exist, and B exists separately. In addition, the character "/" in this document usually represents that the former and later associated objects are in a "or" relationship.

An existing baseband resource pool technology is usually classified into the following three kinds.

First is improving a hardware processing capability of a baseband processing module on a baseband board, so as to reach objectives of protocol supporting, algorithm evolution, new feature supporting, and capacity improvement.

Second is baseband resource sharing. The baseband board in an LTE base station usually adopts multiple baseband processing units, and supports multiple sectors. A probability that peak values occur in services of multiple sectors at the same time is low. Therefore, a baseband processing capability may be shared in multiple sectors, thereby reducing the whole configuration requirement of the baseband processing capability, and saving a cost.

Third is baseband resource redundant backup and energy saving. That is, by adding a baseband processing module or using an idle resource of the module, when a cell service cannot be used due to the failure in part of baseband resources, the service is migrated to a new resource, thereby keeping continuity of the service, and improving reliability of a system.

It can be seen that, an existing baseband resource pool technology usually implements baseband resource sharing in a baseband board, and implements exchange of redundant cell data between baseband modules. In this way, the cost of a single baseband board increases, and if user capacity in a cell coverage area is small, resources may be wasted.

In the prior art, there is no technical solution for implementing processing capability extension between baseband boards through a baseband resource pool.

In terms of the foregoing defects, an embodiment of the present invention provides a method for implementing a baseband resource pool in an LTE base station. The LTE base station includes a main control module, a master board and a slave board, where the master board and the slave board each include a baseband processing module. The method includes:

configuring, by the main control module, information of a cell needing load sharing on the master board to the slave board;

modifying, by the main control module, an SRS configuration parameter of the cell according to a baseband processing capability of the LTE base station;

configuring, by the main control module, an SRS resource allocation policy of the cell;

configuring, by the main control module, user information in the cell to each of the master board and the slave board, or configuring user information to each of the master board and the slave board according to load balance; and performing load sharing processing, by the master board and the slave board, on an SRS signal of a user according to the SRS resource allocation policy.

The present invention further provides a method for implementing a baseband resource pool in an LTE base station. The LTE base station includes a main control module, an L2 scheduling module, a master board and a slave board, where the master board and the slave board each include a baseband processing module. The method includes:

configuring, by the main control module, information of a cell needing load sharing on the master board to the slave board;

modifying, by the main control module, a configuration parameter of the cell according to a baseband processing capability of the LTE base station;

configuring, by the main control module, user information in the cell to each of the master board and the slave board, or configuring user information to each of the master board and the slave board according to load balance;

allocating, by the L2 scheduling module according to the load balance, uplink users needing to be processed at a current TTI to the master board and the slave board for processing; and processing, by each the master board and the slave board, the PUSCH and the PUCCH of an uplink user.

The present invention further provides a method for implementing a baseband resource pool in an LTE base station. The LTE base station includes a main control module, an L2 scheduling module, an intermediate radio frequency module, a master board and a slave board, where the master board and the slave board each include a baseband processing module. The method includes:

configuring, by the main control module, information of a cell needing load sharing on the master board to the slave board;

modifying, by the main control module, a configuration parameter of the cell according to a baseband processing capability of the LTE base station;

configuring, by the main control module, user information in the cell to each of the master board and the slave board, or configuring user information to each of the master board and the slave board according to load balance;

allocating, by the L2 scheduling module according to the load balance, downlink users needing to be processed at a current TTI to the master board and the slave board for processing;

performing, by each of the master board and the slave board, bit-level processing on a PDSCH TB block of a downlink user;

sending, by the slave board, data after the bit-level processing to the master board; and processing, by the master board, all the data after the bit-level processing, and sending a processing result to the intermediate radio frequency module.

The embodiments are further illustrated through specific implementation manners and with reference to the accompanying drawings.

Embodiment 1

Figure 4:
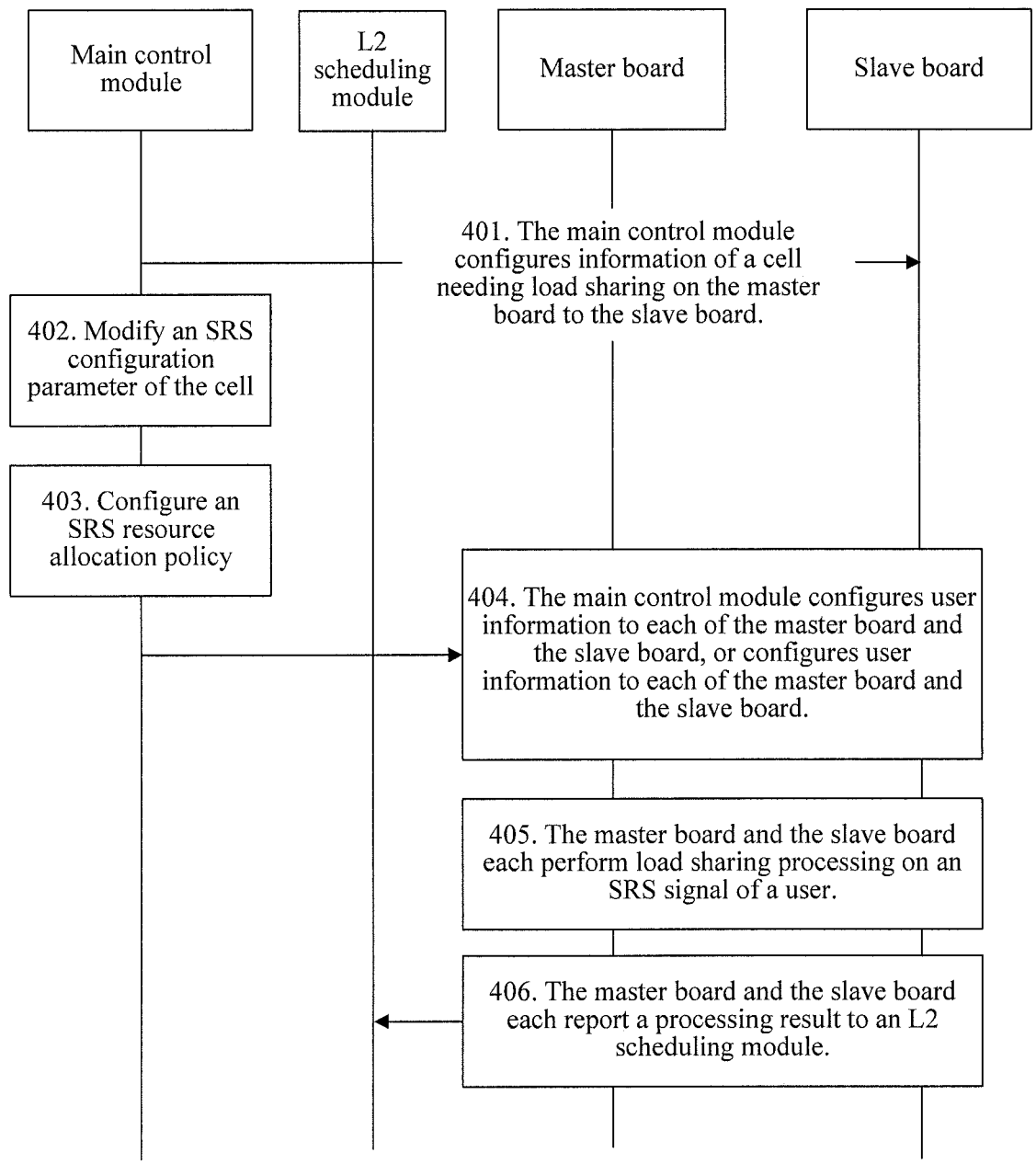
FIG. 4 is a flow chart of a method for implementing a baseband resource pool in an LTE base station provided by an embodiment of the present invention.
Figure 5:
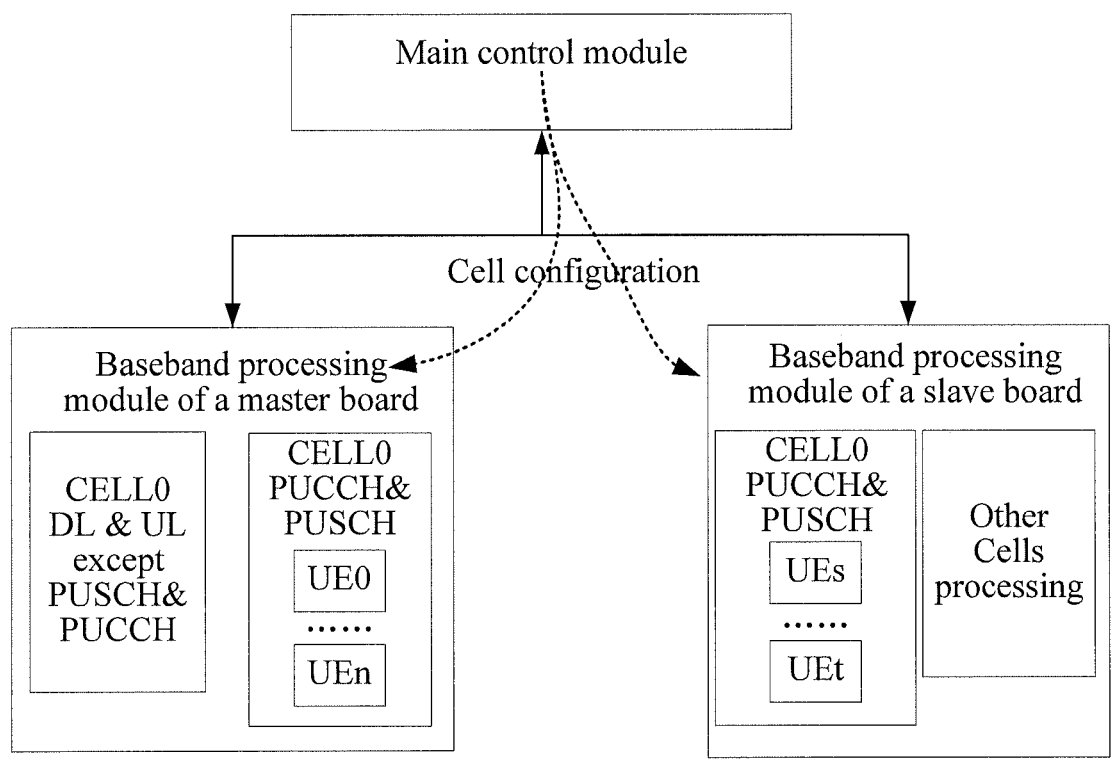
FIG. 5 is a schematic diagram of a method for implementing a baseband resource pool in an LTE base station provided by an embodiment of the present invention.
Figure 6:
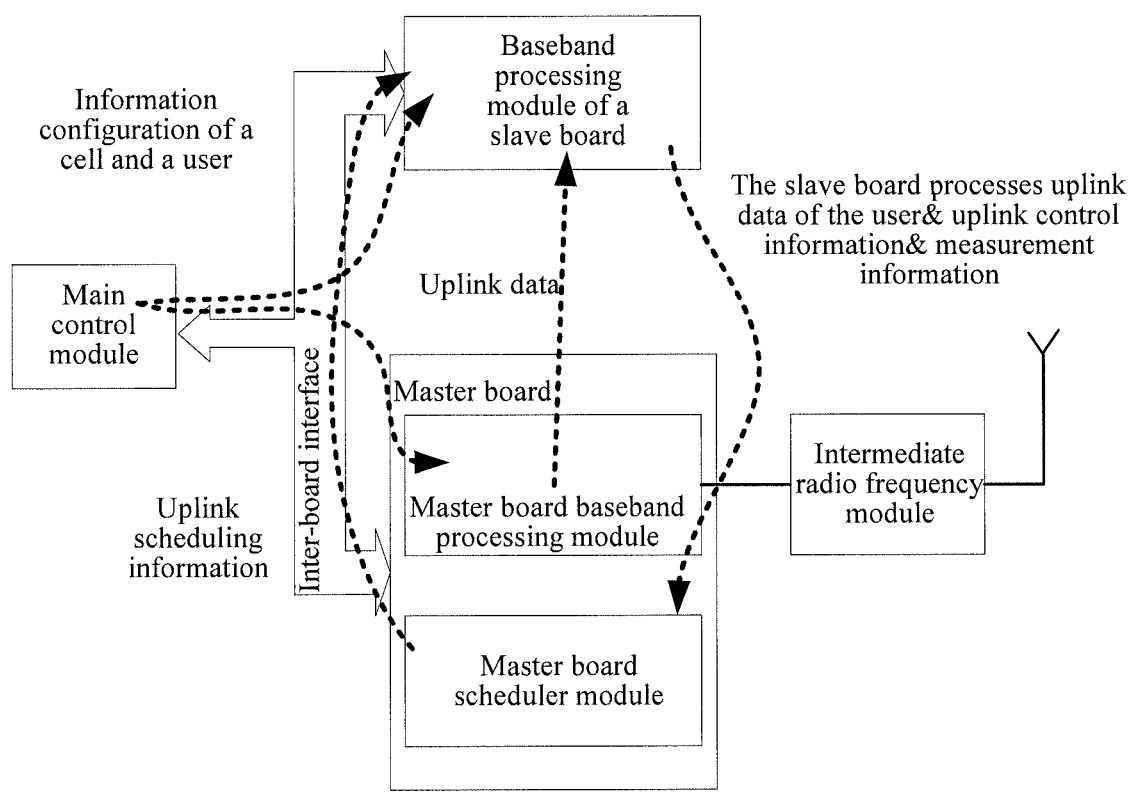
FIG. 6 is a diagram of an inter-board interface of a baseband resource pool in an LTE base station provided by an embodiment of the present invention.

FIG. 4 is a flow chart of a method for implementing a baseband resource pool in an LTE base station provided by an embodiment of the present invention. Referring to FIG. 4:

Step 401: The LTE base station includes a main control module, a master board and a slave board, where the master board and the slave board each include a baseband processing module, and the main control module configures information of a cell needing load sharing on the master board to the slave board.

In this step, a baseband processing module is added in a manner of adding a slave board, and multiple baseband processing modules may be added, that is, one or more slave board may be added. An original baseband board including a baseband processing module in the LTE base station, that is, in an eNB, acts as a master board. The main control module configures information of a cell needing load sharing on the master board to the baseband processing module of the slave board.

Step 402: The main control module modifies an SRS configuration parameter of the cell according to a baseband processing capability of the LTE base station.

The main control module may modify the SRS configuration parameter of the cell, such as shortening an SRS period of the cell, or shortening the SRS period of a user, or increasing the number of SRS user code divisions, so as to support more UEs of the cell to send an SRS signal, and improve user capacity of the cell.

Step 403: The main control module configures an SRS resource allocation policy of the cell.

The main control module allocates, according to user quantity, SRS signals of the users to the master board and the slave board to perform load sharing processing.

Step 404: The main control module configures user information in the cell to each of the master board and the slave board, or configures the user information to each of the master board and the slave board according to load balance.

Step 405: The master board and the slave board each perform load sharing processing on an SRS signal of a user according to the SRS resource allocation policy.

The master board and the slave board each demodulate and decode the SRS signal of the user configured by the main control module according to the SRS configuration parameter of the cell and the SRS configuration parameter of the user at a current TTI (Transmission Time Interval, transmission time interval).

Step 406: The master board and the slave board each report a processing result to an L2 scheduling module.

In this embodiment, the LTE base station may further include an L2 scheduling module, and the L2 scheduling module is usually located on the master board, or is located on the baseband board where the main control module is located. Therefore, the slave board needs to send uplink data, uplink control signaling and the processing result of the user to the L2 scheduling module through an inter-board interface.

Figure 3:
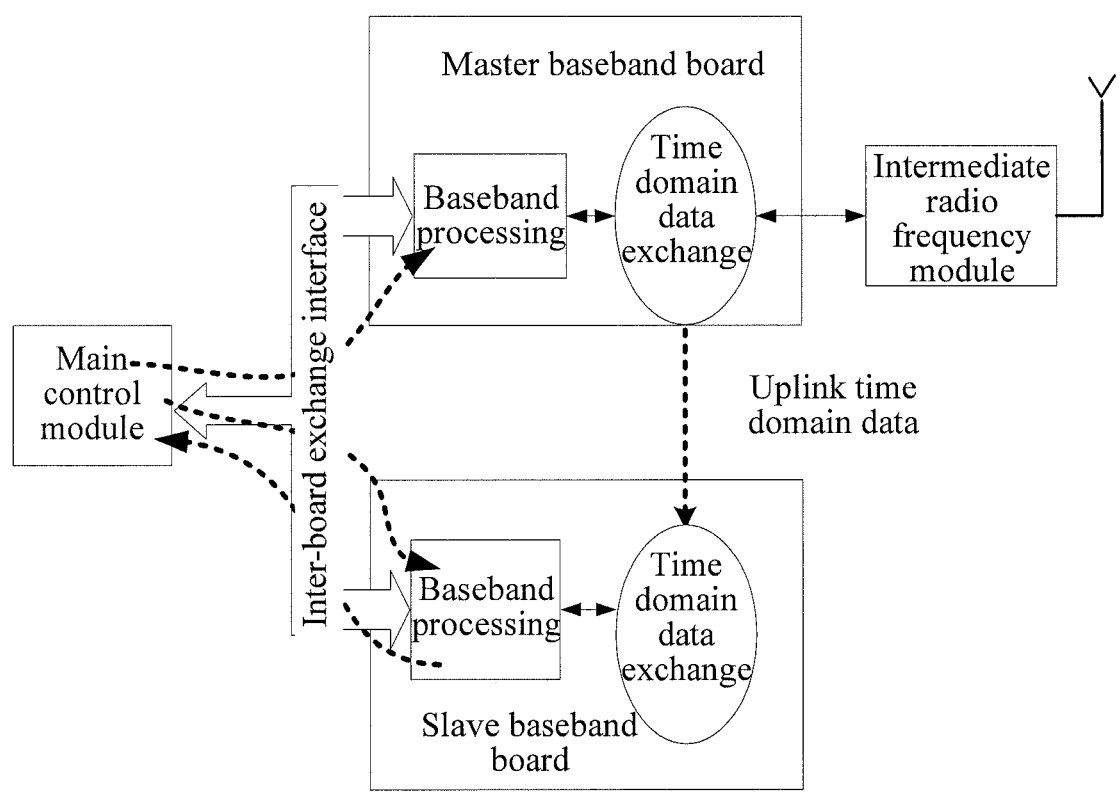
FIG. 3 is a schematic diagram of cross-baseband board data interaction in an LTE base station provided by an embodiment of the present invention.

This embodiment relates to cross-baseband board data interaction, and the specific interaction manner is as shown in FIG. 3: the main control module sends information of a cell needing load sharing and user configuration information to the baseband processing module on the master board and the baseband processing module on the slave board through an inter-board exchange interface, and then the main control module configures the inter-board interface, and forwards an uplink time domain signal or an uplink frequency domain signal of a cell needing load sharing to an exchange interface of the slave board through an inter-board time domain exchange interface, so as to send the signal to the baseband processing module on the slave board. The baseband processing module of the slave board may also send a part of processing results to the baseband processing module of the master board through an inter-board exchange interface or may directly send it to the main control module, which mainly depends on a specific baseband processing algorithm.

Embodiment 2

Figure 7:
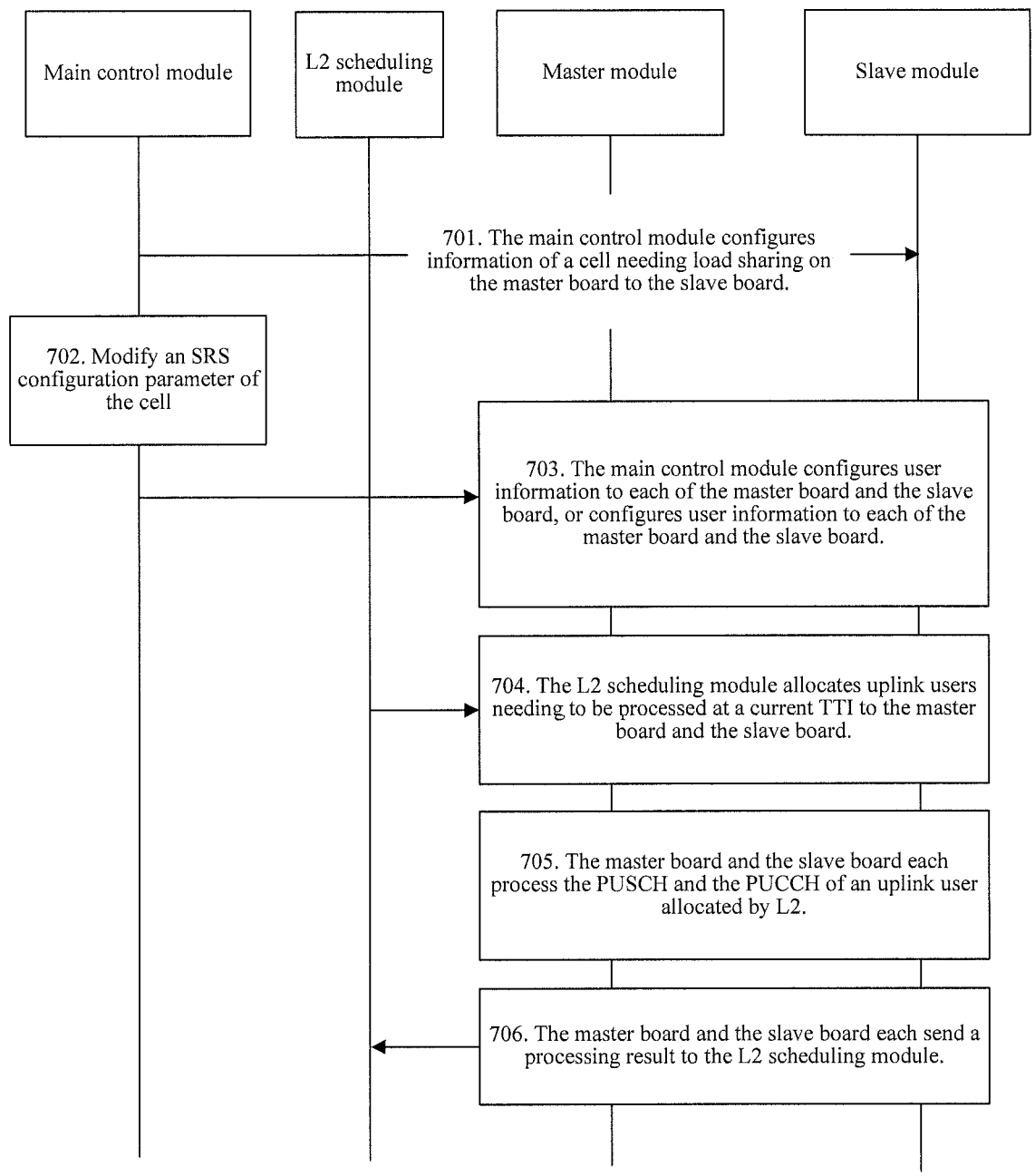
FIG. 7 is a flow chart of a method for implementing a baseband resource pool in an LTE base station provided by an embodiment of the present invention.
Figure 8:
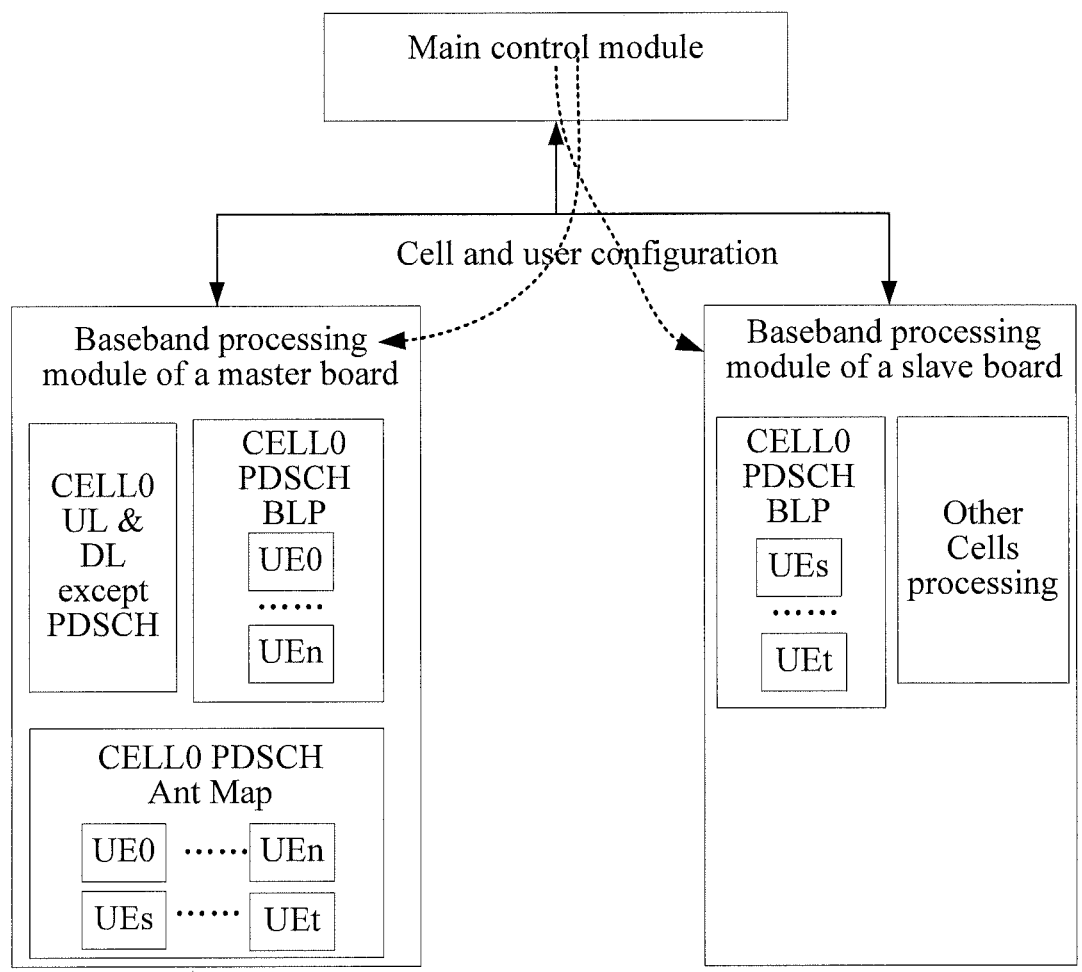
FIG. 8 is a schematic diagram of a method for implementing a baseband resource pool in an LTE base station provided by an embodiment of the present invention.

FIG. 7 is a flow chart of a method for implementing a baseband resource pool in an LTE base station provided by an embodiment of the present invention. Referring to FIG. 7:

Step 701: The LTE base station includes a main control module, an L2 scheduling module, a master board and a slave board, where the master board and the slave board each include a baseband processing module, and the main control module configures information of a cell needing load sharing on the master board to the slave board.

In this step, the baseband processing module is added in a manner of adding the slave board, and multiple baseband processing modules may be added, that is, one or more slave board may be added. An original baseband board including the baseband processing module in an LTE base station, that is, in an eNB, acts as the master board. The main control module configures information of a cell needing load sharing on the master board to the baseband processing module of the slave board.

Step 702: The main control module modifies a configuration parameter of the cell according to a baseband processing capability of the LTE base station.

The main control module can modify the PUCCH configuration of a user, to shorten the PUCCH period of the user, and to increase the number of activated cell users that a baseband module can process. Alternatively, the number of uplink users scheduled at each TTI or the number of RBs can be increased, so as to add an uplink throughput rate.

Step 703: The main control module configures user information in the cell to each of the master board and the slave board, or configures user information to each of the master board and the slave board according to load balance.

Step 704: The L2 scheduling module allocates, according to the load balance, uplink users needing to be processed at a current TTI to the master board and the slave board for processing.

The L2 scheduling module allocates, according to the load balance, uplink users needing to be processed at a current TTI to the master board and the slave board for processing; and sends uplink scheduling indication to each of the master board and the slave board.

Step 705: The master board and the slave board each process the PUSCH and the PUCCH of an uplink user.

According to the uplink scheduling indication sent by the L2 scheduling module in step 704, the master board and the slave board each demodulate the PUSCH and decode the PUCCH of an uplink user allocated by the L2 scheduling module.

Step 706: The master board and the slave board each send a processing result to the L2 scheduling module.

The L2 scheduling module is usually located on the master board, or is located on the baseband board where the main control module is located, and therefore, the slave board needs to send uplink data, uplink control signaling and the processing result of the user to the L2 scheduling module through the inter-board interface.

This embodiment relates to cross-baseband board data interaction, and the specific interaction manner is as described in Embodiment 1.

Embodiment 3

Figure 9:
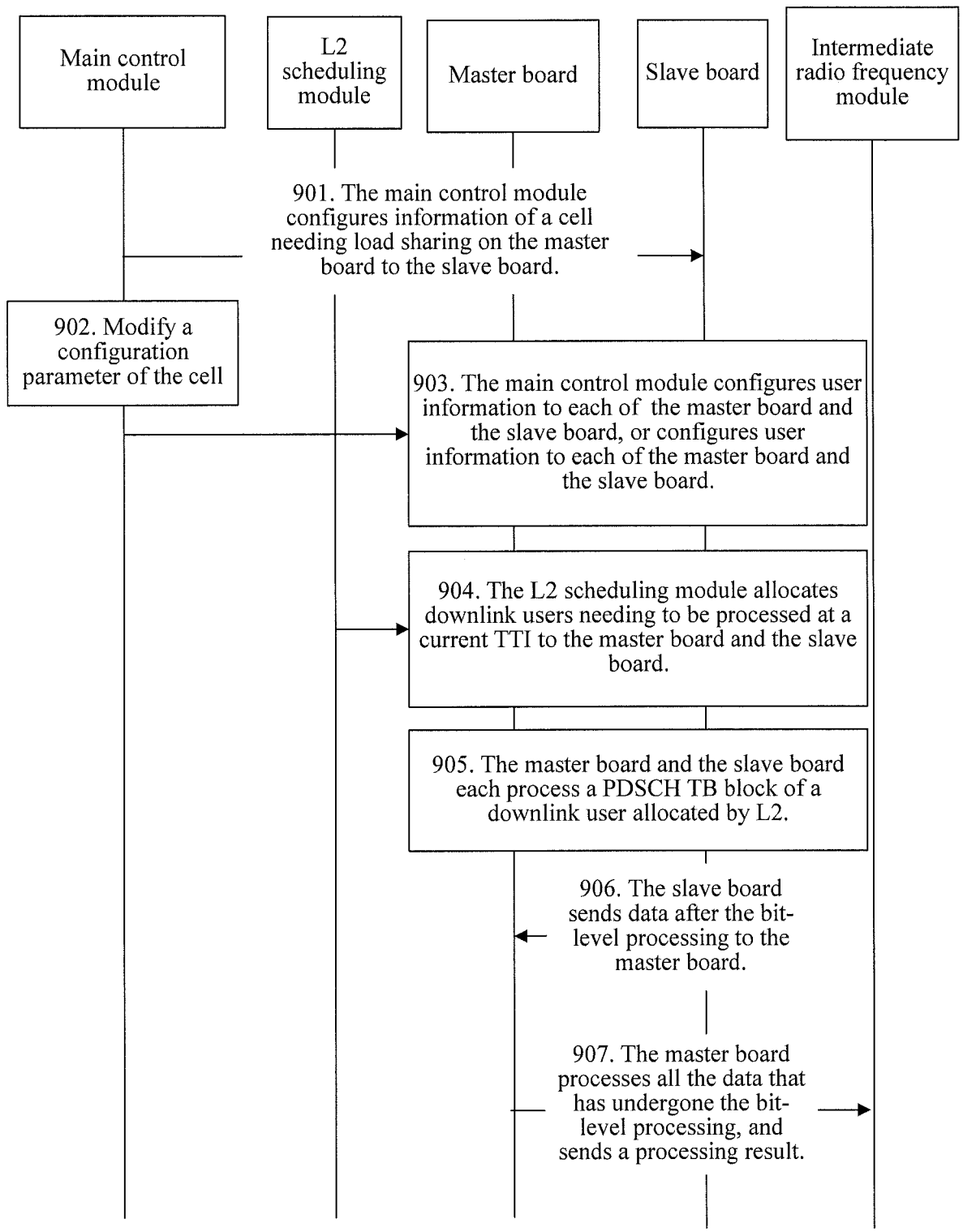
FIG. 9 is a flow chart of a method for implementing a baseband resource pool in an LTE base station provided by an embodiment of the present invention.
Figure 10:
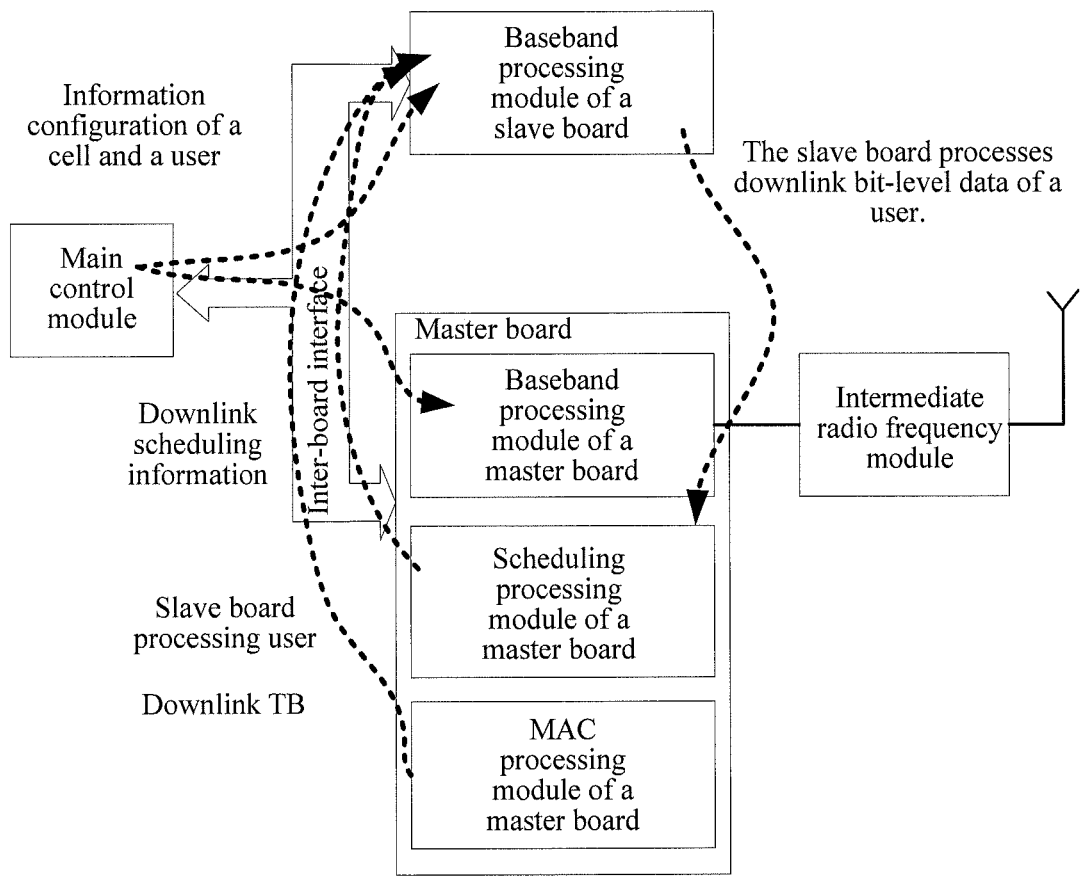
FIG. 10 is a diagram of an inter-board interface of a baseband resource pool in an LTE base station provided by an embodiment of the present invention.

FIG. 9 is a flow chart of a method for implementing a baseband resource pool in an LTE base station provided by another embodiment of the present invention. As shown in FIG. 9:

Step 901: The LTE base station includes a main control module, an L2 scheduling module, an intermediate radio frequency module, a master board and a slave board, where the master board and the slave board each include a baseband processing module, and the main control module configures information of a cell needing load sharing on the master board to the slave board.

In this step, a baseband processing module is added in a manner of adding a slave board, and multiple baseband processing modules may be added, that is, one or more slave board may be added. An original baseband board including the baseband processing module in the LTE base station, that is, in an eNB, acts as the master board. The main control module configures information of a cell needing load sharing on the master board to the baseband processing module of the slave board.

Step 902: The main control module modifies a configuration parameter of the cell according to a baseband processing capability of the LTE base station.

The main control module may increase the number of downlink users scheduled at each TTI and downlink data traffic needing to be sent, thereby improving the downlink throughput of the cell.

Step 903: The main control module configures user information in the cell to each of the master board and the slave board, or configures the user information to each of the master board and the slave board according to load balance.

Step 904: The L2 scheduling module allocates, according to the load balance, downlink users needing to be processed at a current TTI to the master board and the slave board for processing.

The L2 scheduling module is usually located on the master board, or is located on the baseband board where the main control module is located. The L2 scheduling module allocates, according to the load balance, downlink users needing to be processed at a current TTI to the master board and the slave board for processing, and sends downlink scheduling indication to each of the master board and the slave board.

Step 905: The master board and the slave board each perform bit-level processing on a PDSCH TB block of a downlink user.

According to the downlink scheduling indication sent by the L2 scheduling module in step 904, the master board and the slave board each perform processing, such as Trubo coding, interleaving, rate matching, modulation, on the PDSCH TB block of a downlink user allocated by the L2 scheduling module.

Step 906: The slave board sends data after the bit-level processing to the master board.

According to definition of an LTE protocol, all user data needs to be mapped to corresponding antennas in a frequency domain, undergoes time domain and frequency domain conversion and is sent to the intermediate radio frequency module, and then is transmitted through the antennas. Therefore, data of each user after the bit-level processing needs to be combined, and mapped in the frequency domain. This function may be performed in the baseband processing module of the master board. Therefore, the baseband processing module of the slave board needs to send user data after the bit-level processing to the baseband processing module of the master board through an inter-board interface.

Step 907: The master board processes all the data that has undergone the bit-level processing, and sends a processing result to the intermediate radio frequency module.

The master board, according to the downlink scheduling indication, maps all the data that has undergone the bit-level processing to the antennas in the frequency domain, and after precoding the data and performing frequency domain and time domain conversion on the data, sends the data to the intermediate radio frequency module.

All the data after the bit-level processing includes data obtained after the master board performs bit-level processing on the PDSCH TB block of the user, and data obtained after the slave board performs the bit-level processing on the PDSCH TB block of the user and sent to the master board.

This embodiment relates to cross-baseband board data interaction, and the specific interaction manner is as the description in Embodiment 1.

In the method for implementing a baseband resource pool in an LTE base station provided by the embodiment of the present invention, a baseband processing module is added in a manner of adding a slave baseband board, load sharing processing between baseband processing modules on a master baseband board and a slave baseband board improves the baseband processing capability of the LTE base station, and supports the improvement of the specification of the LTE base station.

Embodiment 4

Figure 11:
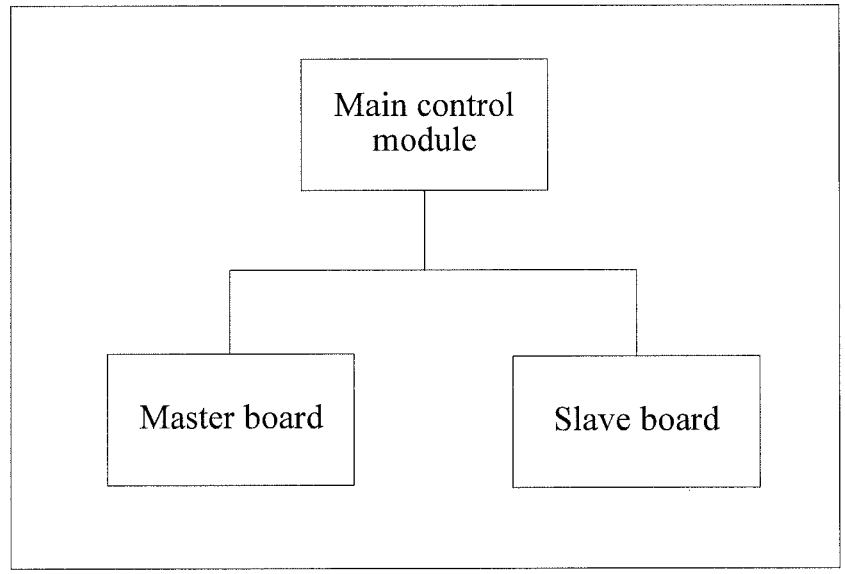
FIG. 11 is a structural diagram of a device for implementing a baseband resource pool in an LTE base station provided by an embodiment of the present invention.

As shown in FIG. 11, on the basis of the foregoing method embodiment, an embodiment of the present invention further provides a method and a device for implementing a baseband resource pool in an LTE base station, where the device includes a main control module, a master board and a slave board.

The main control module is configured to configure information of a cell needing load sharing on the master board to the slave board, modify a sounding reference signal SRS configuration parameter of the cell according to a baseband processing capability of the LTE base station, configure an SRS resource allocation policy of the cell, configure user information in the cell to each of the master board and the slave board, or configure user information to each of the master board and the slave board according to load balance.

The master board and the slave board each include a baseband processing module, and each are configured to perform load sharing processing on an SRS signal of a user according to the SRS resource allocation policy.

The device may further include an L2 scheduling module. After performing load sharing processing on the SRS signal of the user, the master board and the slave board each report a processing result to the L2 scheduling module.

The configuring the SRS resource allocation policy of the cell refers to that the main control module allocates, according to user quantity, SRS signals of the users to the master board and the slave board to perform load sharing processing.

The processing refers to demodulating and decoding the SRS signal.

Embodiment 5

Figure 12:
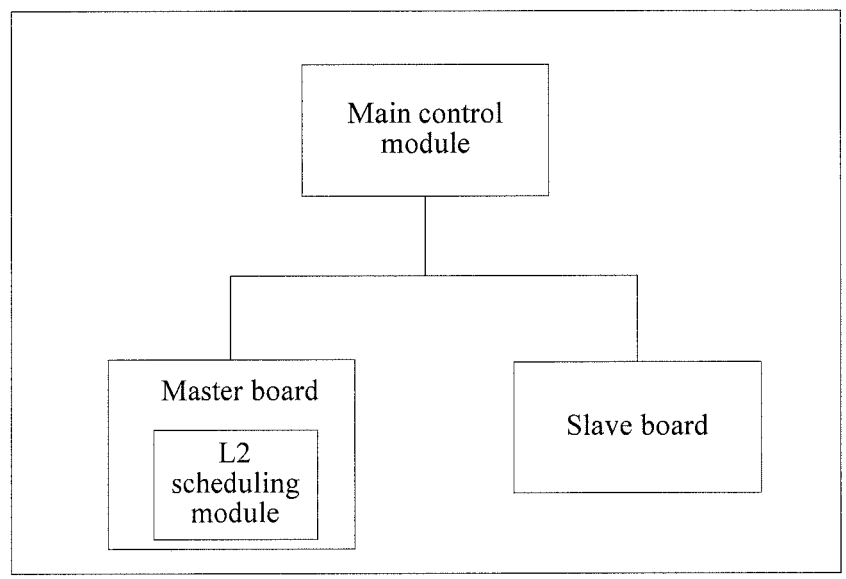
FIG. 12 is a structural diagram of a device for implementing a baseband resource pool in an LTE base station provided by an embodiment of the present invention.

As shown in FIG. 12, on the basis of the foregoing method embodiment, an embodiment of the present invention further provides a method and a device for implementing a baseband resource pool in an LTE base station, where the device includes a main control module, an L2 scheduling module, a master board and a slave board.

The main control module is configured to configure information of a cell needing load sharing on the master board to the slave board, modify a configuration parameter of the cell according to a baseband processing capability of the LTE base station, configure user information in the cell to each of the master board and the slave board, or configure user information to each of the master board and the slave board according to load balance.

The L2 scheduling module is configured to allocate, according to the load balance, uplink users needing to be processed at a current TTI to the master board and the slave board for processing, and is further configured to receive a processing result sent by each of the master board and the slave board.

The master board and the slave board each include a baseband processing module, and each are configured to process the PUSCH and the PUCCH of an uplink user.

The processing refers to demodulating the PUSCH and decoding the PUCCH.

The L2 scheduling module is located on the master board, or is located on the baseband board where the main control module is located. In this embodiment, FIG. 12 is a set-up diagram when an L2 scheduling module is located on a master board.

Embodiment 6

Figure 13:
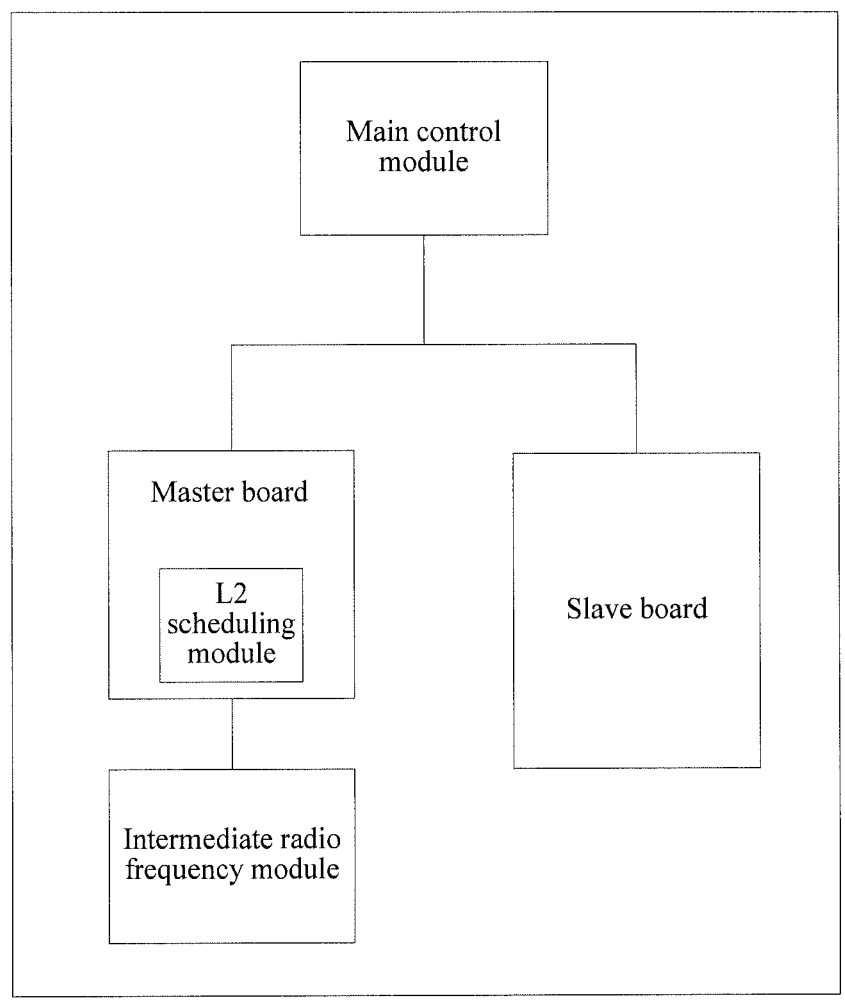
FIG. 13 is a structural diagram of a device for implementing a baseband resource pool in an LTE base station provided by an embodiment of the present invention.

As shown in FIG. 13, on the basis of the foregoing method embodiment, an embodiment of the present invention further provides a method and a device for implementing a baseband resource pool in an LTE base station, wherein the device includes a main control module, an L2 scheduling module, an intermediate radio frequency module, a master board and a slave board.

The main control module is configured to configure information of a cell needing load sharing on the master board to the slave board, modify a configuration parameter of the cell according to a baseband processing capability of the LTE base station, configure user information in the cell to each of the master board and the slave board, or configure user information to each the master board and the slave board according to load balance.

The L2 scheduling module is configured to allocate, according to the load balance, downlink users needing to be processed at a current TTI to the master board and the slave board for processing.

The slave board includes a baseband processing module, and is configured to perform bit-level processing on a PDSCH TB block of a downlink user, and send data after the bit-level processing to the master board.

The master board includes a baseband processing module, and is configured to perform bit-level processing on a PDSCH TB block of the downlink user, process all the data that has undergone the bit-level processing and send a processing result to the intermediate radio frequency module.

The intermediate radio frequency module is configured to receive the processing result sent by the master board.

The bit-level processing refers to performing one or several of Turbo coding, interleaving, rate matching on the PDSCH TB block of the downlink user.

The processing refers to that the master board maps all the data that has undergone the bit-level processing to antennas in a frequency domain, and precodes the data and performs frequency domain and time domain conversion on the data.

All the data that has undergone the bit-level processing refers to data obtained after the master board and the slave board each perform the bit-level processing on the PDSCH TB block of the downlink user.

The L2 scheduling module is located on the master board, or is located on the baseband board where the main control module is located. In this embodiment, FIG. 13 is a set-up diagram when an L2 scheduling module is located on a master board.

Those skilled in the art may clearly understand that for the convenience and brevity of description, for the specific working processes of the system, the apparatus, and the unit described above, reference may be made to the corresponding processes in the above method embodiments, and no repeated description is provided herein.

In several embodiments of the present invention, it should be understood that the disclosed system, apparatus, and method may be implemented in other manners. For example, the described device embodiments are merely exemplary. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections are implemented through some interfaces. The indirect couplings or communication connections between the devices or units may be implemented in electronic, mechanical or other forms.

The units described as separate parts may be or may not be physically separate, and parts displayed as units may be or may not be physical units, that is, may be located in one position, or may be distributed on multiple network elements. A part or all of the units may be selected according to actual requirements to achieve the objectives of the solutions of the embodiments.

In addition, function units in each embodiment of the present invention may be integrated into a processing unit, or each of the units may exist alone physically, or two or more units are integrated into a unit. The integrated unit may be implemented in a form of hardware, or may be implemented in a form of a software functional unit.

The integrated unit, if implemented in the form of a software functional unit and sold or used as a separate product, may be stored in a computer-readable storage medium. Based on such understanding, the technical solutions of the present invention in essence, or the part that makes a contribution to the prior art, or all or a part of the technical solutions may be implemented in the form of software product, where the computer software product is stored in a storage medium and includes multiple instructions to enable a computer device (which may be a personal computer, a server, or a network device) to execute all or a part of the method described in each embodiment of the present invention. The storage medium includes: any medium that can store program code, such as a U-disk, a removable hard disk, a read-only memory (ROM, Read-Only Memory), a random access memory (RAM, Random Access Memory), a magnetic disk, or a CD-ROM.

The above description is merely about the exemplary embodiments of the present invention, which makes persons skilled in the art understand or implement the present invention. Various modifications of the embodiments are apparent to persons of ordinary skill in the art, and general principles defined in the document can be implemented in other embodiments without departing from the spirit or scope of the present invention. Therefore, the present invention will not be limited to the embodiments described in the document but extends to the widest scope that complies with the principles and novelty disclosed in the document.

What is claimed is:

1. A method for implementing a baseband resource pool in an LTE (Long Term Evolution) base station, wherein the LTE base station comprises at least one processor configured to implement a main control module and a layer 2 (L2) scheduling module, a master board, and a slave board, and the master board and the slave board each comprise a respective baseband processing module, the method comprising:
   configuring, by the main control module, information of a cell needing load sharing from the master board to the slave board;
   modifying, by the main control module, a configuration parameter of the cell according to a baseband processing capability of the LTE base station, or configuring, by the main control module, user information to each of the master board and the slave board according to a load balance;
   allocating, by the L2 scheduling module according to the load balance, a plurality of uplink user devices needing to be processed at a current TTI (transmission time interval) to the master board and the slave board;
   sending, by the L2 scheduling module, an uplink scheduling indication to each of the master board and the slave board;
   processing, by the master board, physical uplink control channels (PUCCHs) and physical uplink shared channels (PUSCHs) of a portion of the plurality of uplink user devices; and
   processing, by the slave board, PUCCHs and PUSCHs of remaining uplink user devices of the plurality of uplink user devices;
   wherein processing, by the master board, the PUCCHs and the PUSCHs of the portion of the plurality of uplink user devices and processing, by the slave board, the PUCCHs and the PUSCHs of the remaining uplink user devices of the plurality of uplink user devices comprises:
   processing, by the master board according to the uplink scheduling indication sent by the L2 scheduling module, the PUCCHs and the PUSCHs of the portion of the plurality of uplink user devices allocated by the L2 scheduling module, and processing, by the slave board according to the uplink scheduling indication sent by the L2 scheduling module, the PUCCHs and the PUSCHs of the remaining uplink user devices of the plurality of uplink user devices allocated by the L2 scheduling module.

2. The method according to claim 1, wherein:
processing the PUSCHs and the PUCCHs of the portion of the plurality of uplink user devices further comprises demodulating and decoding the PUSCHs and the PUCCHs of the portion of the plurality of uplink user devices.

3. The method according to claim 1, wherein a quantity of slave boards comprised in the LTE base station is more than one.

4. The method according to claim 1, wherein the master board is an original baseband board in the LTE base station, and the slave board is an added baseband board.

5. The method according to claim 1, further comprising:
sending, by each of the master board and the slave board, a respective processing result to the L2 scheduling module.

6. The method according to claim 1, wherein the L2 scheduling module is located on the master board, or is located on a baseband board where the main control module is located.

7. A device for implementing a baseband resource pool in a Long Term Evolution (LTE) base station, wherein the device comprises:
   at least one processor, configured to implement a main control module and a layer 2 (L2) scheduling module;
   a master board; and
   a slave board;
   wherein the main control module is configured to:
   configure information of a cell needing load sharing from the master board to the slave board;
   modify a configuration parameter of the cell according to a baseband processing capability of the LTE base station, or configure user information to each of the master board and the slave board according to a load balance; and
   wherein the L2 scheduling module is configured to:
   allocate, according to the load balance, a plurality of uplink user devices needing to be processed at a current transmission time interval (TTI) to the master board and the slave board; and
   send an uplink scheduling indication to each of the master board and the slave board;
   wherein the master board and the slave board each comprise a respective baseband processing module; and
   wherein the master board and the slave board are configured as follows:
   the master board is configured to process physical uplink control channels (PUCCHs) and physical uplink shared channels (PUSCHs) of a portion of the plurality of uplink user devices, wherein processing the PUCCHS and the PUSCHS of the portion of the plurality of uplink user devices comprises processing the PUCCHs and the PUSCHs of the portion of the plurality of uplink user devices allocated by the L2 scheduling module according to the uplink scheduling indication sent by the L2 scheduling module; and
   the slave board is configured to process PUCCHs and PUSCHs of remaining uplink user devices of the plurality of uplink user devices, wherein processing the PUCCHS and the PUSCHS of the remaining uplink user devices of the plurality of uplink user devices comprises processing the PUCCHs and the PUSCHs of the remaining uplink user devices of the plurality of uplink user devices allocated by the L2 scheduling module according to the uplink scheduling indication sent by the L2 scheduling module.

8. The device according to claim 7, wherein the L2 scheduling module is located on the master board, or is located on a baseband board where the main control module is located.

9. The device according to claim 7, wherein a quantity of slave boards comprised in the LTE base station is more than one.

10. The device according to claim 7, wherein the master board is an original baseband board in the LTE base station, and the slave board is an added baseband board.

11. The device according to claim 7, wherein the master board is configured to send a first processing result to the L2 scheduling module, and the slave board is configured to send a second processing result to the L2 scheduling module.

12. The device according to claim 7, wherein the L2 scheduling module is located on the master board, or is located on a baseband board where the main control module is located.

* * * * *